(12) United States Patent
Kim

(10) Patent No.: US 9,077,887 B2
(45) Date of Patent: Jul. 7, 2015

(54) CAMERA HAVING RECONFIGURABLE LOGIC BLOCKS IN INTEGRATED CIRCUIT EMBEDDED THEREON AND SYSTEM HAVING THE CAMERA

(71) Applicant: Samsung Techwin Co., Ltd., Changwon (KR)

(72) Inventor: Ji-Man Kim, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 119 days.

(21) Appl. No.: 13/898,853

(22) Filed: May 21, 2013

(65) Prior Publication Data

US 2013/0314559 A1 Nov. 28, 2013

(30) Foreign Application Priority Data

May 22, 2012 (KR) .................. 10-2012-0054446

(51) Int. Cl.
*H04N 5/232* (2006.01)

(52) U.S. Cl.
CPC ....... *H04N 5/23203* (2013.01); *H04N 5/23225* (2013.01)

(58) Field of Classification Search
CPC .......... H04N 5/23225; H04N 5/23203; H04N 5/23206
USPC ................... 348/211.99, 211.3, 222.1, 221.1, 348/211.11
See application file for complete search history.

(56) References Cited

U.S. PATENT DOCUMENTS

| | | | |
|---|---|---|---|
| 7,702,133 B2 * | 4/2010 | Muramatsu et al. | 382/104 |
| 8,542,315 B2 * | 9/2013 | Sorek et al. | 348/364 |
| 2006/0164514 A1 * | 7/2006 | Muramatsu et al. | 348/207.99 |
| 2007/0165443 A1 * | 7/2007 | Richardson | 365/105 |
| 2008/0049116 A1 | 2/2008 | Tojima | |
| 2011/0258459 A1 | 10/2011 | Guilley et al. | |

FOREIGN PATENT DOCUMENTS

| | | | |
|---|---|---|---|
| KR | 10-2006-0087732 A | 8/2006 | |
| KR | 10-2010-0018998 A | 2/2010 | |
| KR | 10-0962987 B1 | 6/2010 | |
| KR | 10-2011-0083592 A | 7/2011 | |

* cited by examiner

*Primary Examiner* — Ahmed A Berhan
(74) *Attorney, Agent, or Firm* — Sughrue Mion, PLLC

(57) ABSTRACT

A camera having a reconfigurable logic block and a method for reconfiguring the logic block are provided. The camera includes: an integrated circuit (IC) such as field programmable gate array (FPGA) including at least one logic block; and a processor configured to receive information about the logic block of the IC, and transmit the information about the logic block to the IC to update at least one existing signal processing (ISP) function recorded in the IC or change the existing ISP function to another at least one ISP function for a different use according to the information about the logic block, wherein each of the existing ISP function and the other ISP function is used to process an image signal obtained by the camera.

19 Claims, 6 Drawing Sheets

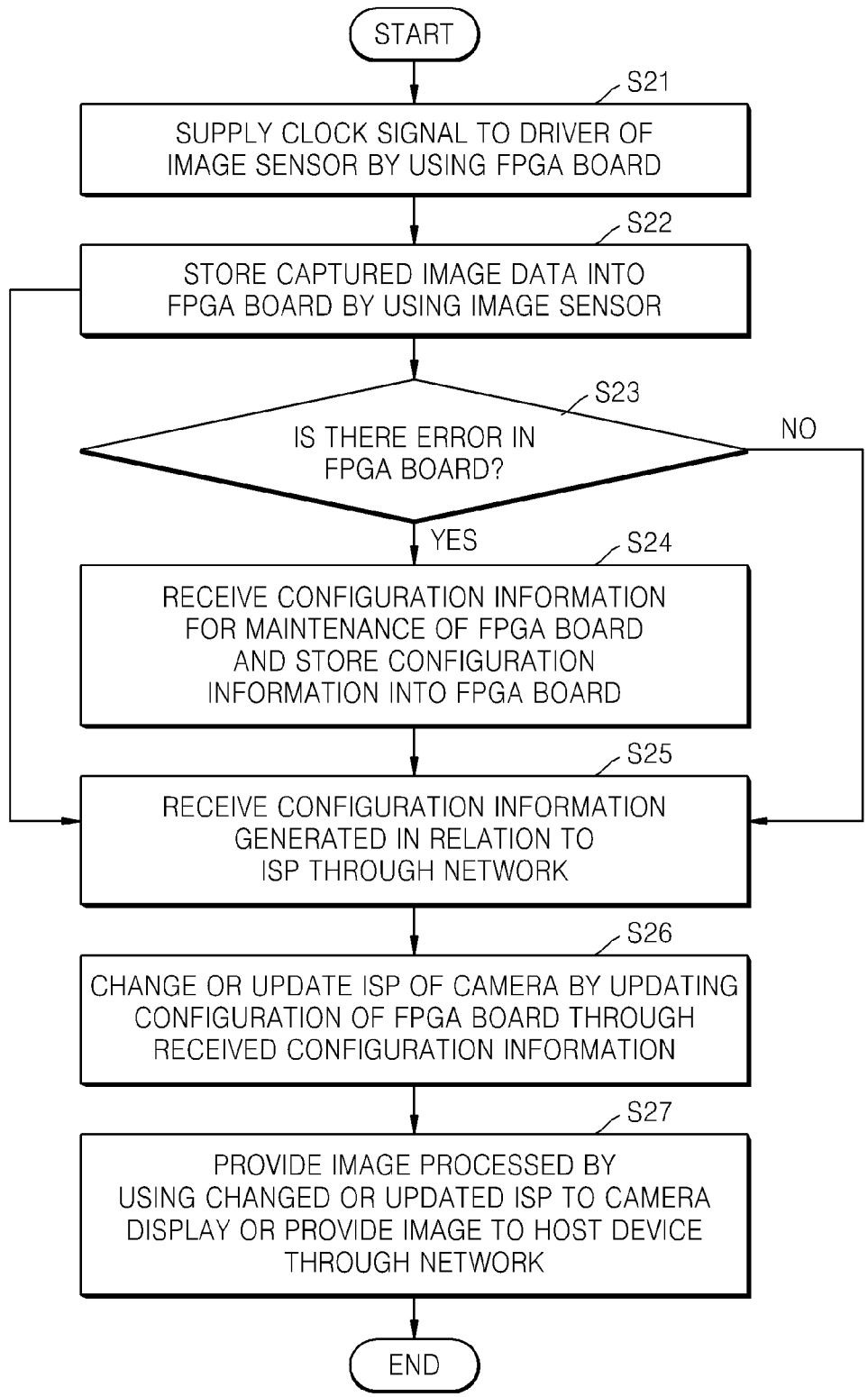

CAMERA HAVING RECONFIGURABLE LOGIC BLOCKS IN INTEGRATED CIRCUIT EMBEDDED THEREON AND SYSTEM HAVING THE CAMERA

CROSS-REFERENCE TO RELATED PATENT APPLICATION

This application claims priority from Korean Patent Application No. 10-2012-0054446, filed on May 22, 2012, in the Korean Intellectual Property Office, the disclosure of which is incorporated herein in its entirety by reference.

BACKGROUND

1. Field

Methods and apparatuses consistent with exemplary embodiments relate to a camera including an integrated circuit (IC) such as a field programmable gate array (FPGA) having a remotely reconfigurable logic block embedded therein and a camera system including the camera.

2. Description of the Related Art

A related art camera system is designed with an off chip, and camera systems that can be used only for a single specific purpose with respect to a single hardware platform have been produced. For example, with respect to a camera having a specific purpose, such as a closed-circuit television (CCTV), an image signal processing (ISP) algorithm corresponding to the purpose is recorded in a chipset during an initial production process of the camera, and thus, hardware should be replaced to change image signal processing (ISP) settings in the camera.

An invention for wirelessly transmitting an image processed in an IC board such as FPGA board mounted in a camera for optical motion capture to a wireless local area network (LAN) of a host computer is disclosed in Korean patent No. 0962987.

SUMMARY

One or more exemplary embodiments provide a camera, method and system for reconfiguring a logic block of an embedded integrated circuit (IC) such as field programmable gate array (FPGA) and changing an image signal processing function (ISP) of the camera.

One or more exemplary embodiments also provide a method and system for performing an ISP function and a communication function in an FPGA embedded in a camera and remotely changing hardware and software configurations of the camera by changing logic blocks of the FPGA board.

According to an aspect of an exemplary embodiment, there is provided a camera having a reconfigurable logic block, the camera including: an integrated circuit (IC) including at least one logic block; and a processor configured to receive information about the logic block of the IC, and transmit the information about the logic block to the IC to update at least one existing signal processing (ISP) function recorded in the IC or change the existing ISP function to another at least one ISP function for a different use according to the information about the logic block, wherein each of the existing ISP function and the other ISP function is used to process an image signal obtained by the camera.

The information about the logic block may include information about an at least one ISP function to update the existing ISP function or change the existing ISP function to the other ISP function.

The IC may include an FPGA.

The existing ISP function may be one of an ISP function for a general purpose camera, an ISP function for a closed-circuit television (CCTV) camera, and an ISP function for a thermal imaging camera, and the other ISP function may be another one of the three ISP functions.

The IC may receive the information about the logic block from the processor whenever power of the camera is turned on, and then, may update the existing ISP function or change the existing ISP function to the other ISP function according to the information about the logic block.

The processor may be configured to receive the information about the logic block of the IC from a read only memory (ROM) embedded in the camera.

If an error occurs while the IC receives the information about the logic block, updates or changes the existing ISP function, the processor reads initial information about the logic block from a read only memory (ROM) embedded in the camera, and transmits the read initial information about the logic block to the IC, and the IC updates the existing ISP function or changes the existing ISP function to the other ISP function according to the information about the logic block.

The processor may remotely receive the information about the logic block of the IC from a host connected to the camera through a network external to the camera.

The IC may perform a function of an Ethernet controller.

The information about the logic block may include information about maintenance of the camera.

Before updating or changing the existing ISP function according to the information about the logic block, the IC may inspect whether the information about the logic block includes an error.

The information about the logic block may be received through an Ethernet network.

According to an aspect of another exemplary embodiment, there is provided a method of reconfiguring at least one logic block of an IC, the method including: receiving information about the logic blocks of the IC; and transmitting the information about the logic block to the IC to update at least one existing signal processing (ISP) function recorded in the IC or change the existing ISP function to another at least one ISP function for a different use according to the information about the logic block, wherein each of the existing ISP function and the other ISP function is used to process an image signal obtained by the camera.

The IC may include an FPGA.

The existing ISP function may be one of an ISP function for a general purpose camera, an ISP function for a closed-circuit television (CCTV) camera, and an ISP function for a thermal imaging camera, and the other ISP function may be another one of the three ISP functions.

The information about the logic block may be received from a ROM embedded in the camera.

The information about the logic block may include information about maintenance of the camera.

Before receiving the information about the logic block, it may be inspected whether the information about the logic block includes an error.

According to an aspect of another exemplary embodiment, there is provided a camera system including: a camera described above; and a host device configured to provide the information about logic block of the IC to the processor of the camera.

The IC may be an FPGA.

BRIEF DESCRIPTION OF THE DRAWINGS

The above and other features will become more apparent by describing in detail exemplary embodiments with reference to the attached drawings, in which:

FIG. 6 is a flowchart illustrating an operation of a camera including an FPGA board having a communication unit, according to an exemplary embodiment.

DETAILED DESCRIPTION OF THE EXEMPLARY EMBODIMENTS

Figure 1:
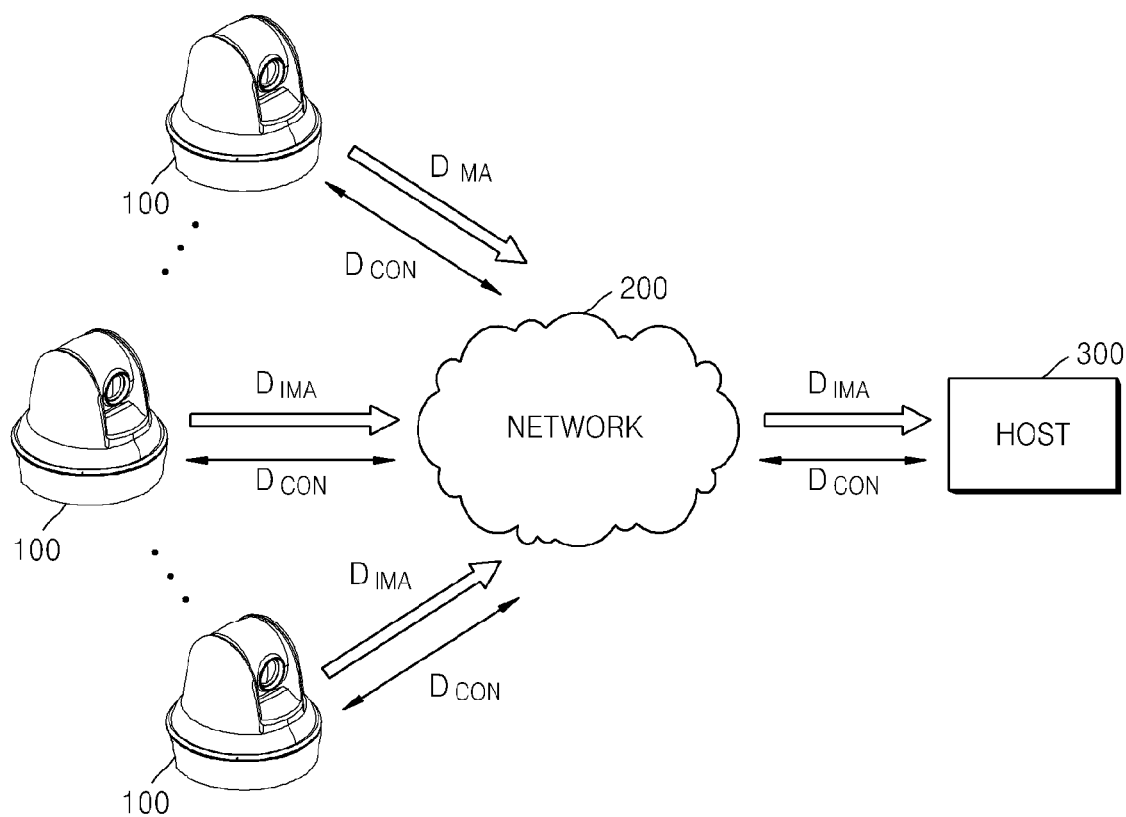
FIG. 1 is a schematic view of a system for remotely reconfiguring logic blocks of a field programmable gate array (FPGA), according to an exemplary embodiment of the present invention.

The inventive concept will now be described more fully with reference to the accompanying drawings, in which exemplary embodiments are shown. It should be understood that the embodiments may vary but do not have to be mutually exclusive. For example, particular shapes, structures, and properties according to one embodiment described in this specification may be modified in other embodiments without departing from the spirit and scope of the inventive concept. In addition, positions or arrangement of individual components of each of the embodiments may also be modified without departing from the spirit and scope of the inventive concept. Accordingly, the detailed description below should not be construed as having limited meanings but construed to encompass the scope of the claims and any equivalent ranges thereto. In the drawings, like reference numerals denote like elements in various aspects.

Hereinafter, the exemplary embodiments will now be described more fully with reference to the accompanying drawings.

FIG. 1 is a schematic view of a system for remotely reconfiguring logic blocks of an integrated circuit (IC) such as a field programmable gate array (FPGA), according to an exemplary embodiment. Hereinafter, exemplary embodiments are explained with respect to an FPGA of a camera.

Referring to FIG. 1, a plurality of cameras 100 send data to a host device 300 through a network 200 and receive data from the host device 300 through the network 200. In detail, the plurality of cameras 100 communicate with the host device 300 through a communication channel DCON and transmit live view video data to the host device 300 through an image data channel DIMA. The system may be variously modified. That is, the system may be configured so that only one camera instead of a plurality of cameras may communicate with the host device 300, or only one camera or a plurality of cameras may communicate with a plurality of host devices. The network 200 forming the communication channel DCON and the image data channel DIMA may be one of means capable of transmitting and receiving data and commands through wires or wirelessly. For example, the network 200 may connect the cameras 100 to the host device 300 through a cable by using a wired local area network (LAN), and may wirelessly connect the cameras 100 to the host device 300 by using a wireless local area network (LAN). The network 200 may be a LAN such as an Ethernet.

Although in FIG. 1, the host device 300 has a form similar to a computer, the camera 100 may communicate not only with a host device such as the host device 300 illustrated in FIG. 1, but may communicate with any device having a display screen. For example, a personal computer may be used as the host device 300. The host device 300 may store a live view video image received from the cameras 100 if necessary.

The host device 300 may generate information about logic blocks, which is used for changing logic blocks, for image signal processing (ISP) functions, mounted on an FPGA board 140 (refer to FIG. 2) inside each camera 100. The information about logic blocks may include information about a logical configuration for performing ISP functions in the FPGA board 140, and may be newly recorded in the FPGA board 140 whenever the power is turned on. Therefore, the host device 300 may remotely change a configuration of the ISP functions of each camera 100 through the network 200.

Figure 2:
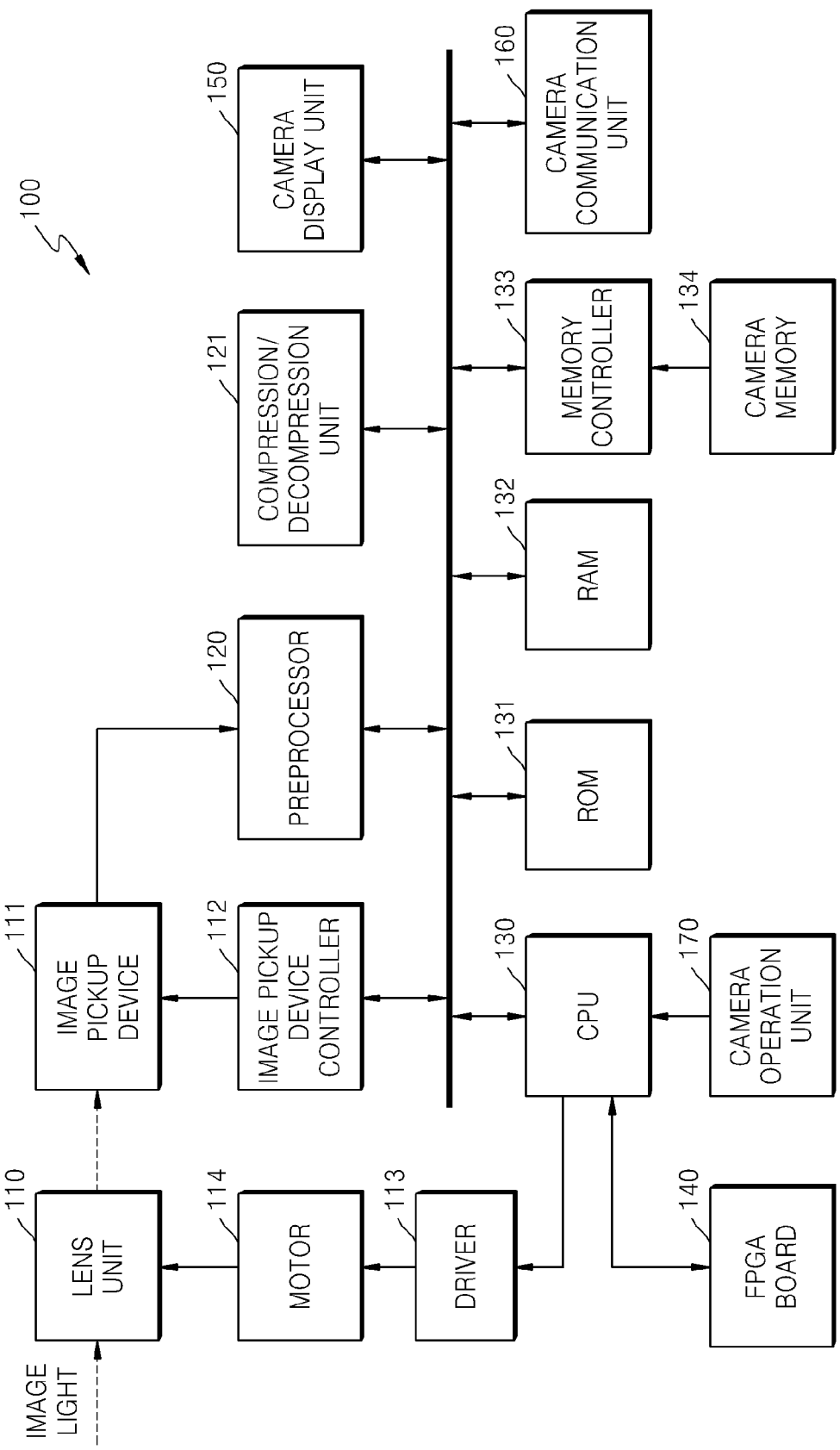
FIG. 2 is a block diagram illustrating a camera 100 which is used in a system for remotely reconfiguring logic blocks of an FPGA of the camera 100, according to an exemplary embodiment.

FIG. 2 is a block diagram illustrating a camera 100 which is used in a system for remotely reconfiguring logic blocks of an FPGA of the camera 100, according to an embodiment.

Referring to FIG. 2, the camera 100 may include a lens unit 110, an image pickup device 111, an image pickup device controller 112, a driver 113, a motor 114, a preprocessor 120, a compression/decompression unit 121, a central processing unit (CPU) 130, a read only memory (ROM) 131, a random access memory (RAM) 132, a memory controller 133, a camera memory 134, an FPGA board 140, a camera display unit 150, a camera communication unit 160, and a camera operation unit 170.

The lens unit 110 is an optical system for forming an image corresponding to external optical information on the image pickup device 111. The lens unit 110 transmits light received from a subject up to the image pickup device 111. The lens unit 110 includes lenses, such as a zoom lens for changing a focal distance and a focus lens for adjusting a focus, and an iris diaphragm for adjusting the intensity of light.

The zoom lens, the iris diaphragm, and the focus lens included in the lens unit 110 are driven by the motor 114 that receives a driving signal from the driver 113.

The image pickup device 111, which is an example of a photoelectric conversion device, includes a plurality of conversion devices that may capture images corresponding to image light received through the lens unit 110 and may convert the captured images into electrical signals. Each conversion device generates an image signal by generating an electrical signal according to incident light. The image pickup device 111 captures a frame image periodically according to a timing signal received from the image pickup device controller 112 and periodically generates an image signal. The image pickup device 111 may use a charge coupled device (CCD) sensor or a complementary metal oxide semiconductor (CMOS) sensor. The image pickup device 111 outputs a digital signal generated by a photoelectric conversion and an analog-to-digital conversion to the preprocessor 120.

The image pickup device controller 112 generates a timing signal to control the image pickup device 111, and the image pickup device 111 may capture an image in synchronization with the timing signal.

The preprocessor 120 processes a digital signal output from the image pickup device 111 and generates an image signal of an image to be processed. The preprocessor 120 outputs the image signal to the FPGA board 140. In addition, the preprocessor 120 controls writing of image data to the RAM 132 and reading of image data from the RAM 132.

The compression/decompression unit 121 receives the image signal and compresses the image signal, for example, in a compression format such as moving picture experts group (MPEG) or quick time movie format (MOV). The compression/decompression unit 121 transmits an image file, which includes image data generated through the compression processing, to the memory controller 133. In addition, the compression/decompression unit 121 may input the image file to the camera communication unit 160, and may transmit the image file to a main server, i.e., the host device 300 controlling the camera 100 through the camera communication unit 160. In addition, the compression/decompression unit 121 may decompress the image file after extracting the image file stored in the camera memory 134 to allow the decompressed image file to be reproduced in the camera display unit 150.

The CPU 130 functions as an operation processing unit and a control unit by a program, and controls processing of each component mounted in the camera 100. In FIG. 2, the CPU 130 is described and illustrated as a general central processing unit. However, the CPU 130 may perform various functions of a processor capable of processing input and output data, such as a microprocessor and the like. The CPU 130 may be formed of one or more central processing units performing a control function. The CPU 130 outputs a signal to the driver 113 based on a focus control or an exposure control to drive the motor 114. In addition, the CPU 130 controls each component of the camera 100 based on a signal received from the camera operation unit 170. The CPU 130 may be formed of a single CPU, or may be formed of a plurality of CPUs to execute commands related to signals and commands related to operations in separate CPUs.

In particular, the CPU 130 may remotely receive information about logic blocks of an FPGA from the host 300 through the camera communication unit 160 and may transmit the received information about logic blocks to the FPGA board 140. The information about logic blocks, which is transmitted from the CPU 300, is recorded in the FPGA board 140. The information about logic blocks may include ISP information of the camera 100.

The ROM 131 may store a user's setting data related to a photographing condition. In addition, the ROM 131 may store an algorithm that is used by the FPGA board 140 to control the camera 100. An electrically erasable and programmable read only memory (EEPROM) may be used as the ROM 131.

The RAM 132 temporarily stores various kinds of data such as the image signal output from the preprocessor 120 and data generated during a signal processing in the FPGA board 140. A dynamic RAM (DRAM) may be used as the RAM 132.

The memory controller 133 controls writing of image data to the camera memory 134 or reading of image data or information about logic blocks, which are stored in the camera memory 134. The camera memory 132 is an optical disc (e.g., CD, DVD, or Blue-ray disc), a magneto-optical disc, a magnetic disc, a semiconductor storage medium, or the like, and stores captured image data. The image data may be data included in the image file generated by the compression/decompression unit 121. The memory controller 133 and the camera memory 134 may be formed to be detachable from the camera 100. However, the memory controller 133 and the camera memory 134 may not be mounted in the camera 100. If the camera 100 is a camera connected to the main server, i.e., the host device 300, through the network 200, a server memory may be provided to store image data in the main server controlling the camera 100. In this case, the camera communication unit 160 may transmit the image data from the camera 100 to the main server through the network 200.

Next, the camera 100 according to the current embodiment is characterized in that the camera 100 is embedded with the FPGA board 140. In a related art camera, ISP functions are implemented by using an off-chip method and it is impossible to change initially set ISP functions unless hardware is replaced. On the other hand, in the camera 100 according to the current embodiment, ISP functions are performed in the FPGA board 140 and the FPGA board 140 may perform ISP functions of an image signal according to recorded information about logic blocks while the power is turned on. According to the current embodiment, ISP functions recorded in the FPGA board 140 may be remotely changed regardless of initially set ISP functions since the CPU 130 may reconfigure information about logic blocks of the FPGA board 140.

The FPGA board 140 is a field programmable gate array embedded in the camera 100. The FPGA board 140 includes a semiconductor device including programmable logic elements and programmable internal lines. The programmable logic elements may program functions of basic logic gates, such as AND, OR, XOR, NOT, a complex decoder, or a combination function. In addition, the FPGA board 140 may include memory elements formed of simple flip-flops or memory blocks as well as the programmable logic elements. In the current embodiment, the information about logic blocks may include information about programmable logic elements, programmable internal lines, and memory elements. Since the programmable logic elements and the programmable internal lines may be programmed after manufacturing process, that is, information about logic blocks of the FPGA board 140 may be newly recorded or changed, any needed logic function may be performed through the FPGA board 140.

In particular, a program of the FPGA board 140 included in the camera 100 may be changed through information about logic blocks, which is transmitted from the host device 300 through the network 200. Accordingly, the function of the camera 100 is not limited to a single function set when the camera is manufactured. For example, the function of the camera 100 may be a function for a thermal imaging camera or a function for a surveillance camera, and may be variously changed according to a use thereof. In more detail, by recording downloaded information about logic blocks in a static random access memory (SRAM) area of the FPGA board 140, the FPGA board 140 may perform ISP functions corresponding to the downloaded information about logic blocks. In addition, an Ethernet controller is integrated on the FPGA board 140. Since the FPGA board 140 includes ISP functions and a function of the Ethernet controller, the FPGA board 140 may perform an operation of a high speed memory band.

A certain FPGA board may include a programmable read only memory (PROM) for recording information about logic blocks in an internal integrated circuit, and a program is recorded in the FPGA board through the PROM whenever the power is turned on. Accordingly, a separate PROM is needed to record information about ISP logic blocks in this FPGA board. In this case, it may be impossible to change data of the PROM when the data is once written to the PROM, and a separate program for writing data to the PROM is needed.

On the contrary, according to the current embodiment, a microprocessor, that is, the CPU 130 of the camera 100, may directly obtain information about logic blocks of the FPGA board 140 and may transmit the obtained information to the FPGA board 140 to reconfigure previously set information about logic blocks of the FPGA board 140. The CPU 130 may receive information about logic blocks from the host 300 or may receive ISP information stored in the ROM 131 of the camera 100 to reconfigure previously set information about logic blocks of the FPGA board 140. Accordingly, according to the current embodiment, the number of components may be reduced since a separate PROM for recording ISP information in the FPGA board 140 is not needed. Additionally, in the embodiment, even if an update error occurs as the power is turned off while the CPU 130 updates information about logic blocks of the FPGA board 140, original information about logic blocks of the FPGA board 140 may be restored by using an initial image, that is, a golden image stored in the ROM 131 of the camera 100. In this case, hacking into the ROM 131 may be prevented by applying data encryption to the ROM 131.

A detailed internal structure of the FPGA board 140 is later described below with reference to FIG. 3.

The camera display unit 150 displays a captured image, an image stored in the camera memory 134 after being captured, or an image decompressed by the compression/decompression unit 121. In addition, the camera display unit 150 may display various setting screens for controlling the camera 100.

The camera communication unit 160 transmits a live view video image captured by the camera 100 or an image stored in the camera memory 134 after being captured, and then, stored on an external device, e.g., the host device 300, through the network 200 that is a wired or wireless network. In addition, the camera communication unit 160 receives various command signals that are transmitted from the host device 300 through the network 200. In particular, the camera communication unit 160 may download information about logic blocks of the FPGA board 140 from the host device 300.

The camera operation unit 170 includes, for example, various kinds of buttons or levers installed in the camera 100, and transmits an operational signal to the FPGA board 140 based on an operation of a user. However, the camera operation unit 170 may not be mounted in the camera 100. If the camera 100 is a camera connected to the network 200, a server operation unit may be included in the main server (i.e., the host device 300) controlling the camera 100 and an operation of the camera 100 may be controlled by a signal that is applied through the server operation unit.

Figure 3:
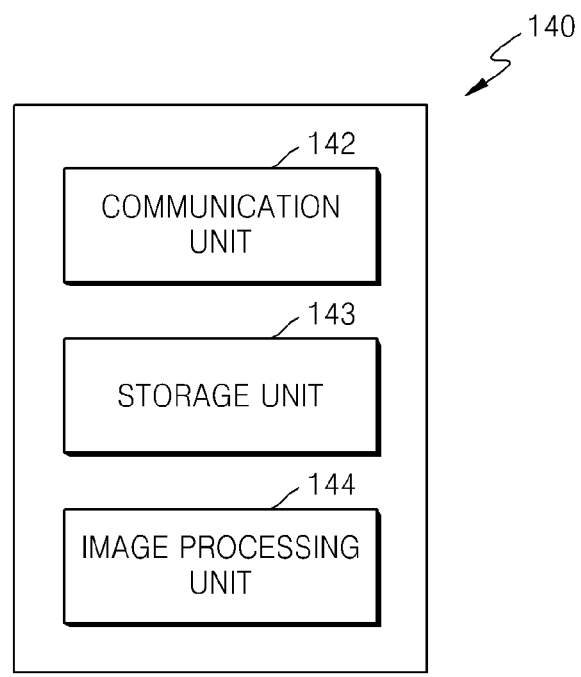
FIG. 3 is a diagram illustrating an internal structure of an FPGA board, according to an exemplary embodiment.

FIG. 3 is a diagram illustrating an internal structure of the FPGA board 140, according to an exemplary embodiment.

Referring to FIG. 3, the FPGA board 140 includes a communication unit 142, a storage unit 143, and an image processing unit 144. In FIG. 3, components of the FPGA board 140 are illustrated as blocks and the blocks correspond to functions of integrated circuits used in the FPGA board 140. The FPGA board 140 may remotely change a hardware configuration of the camera 100 as well as a software configuration of the camera 100 by updating logic block information, and thus, an image processing method of the camera 100, that is, logic blocks of the ISP functions may be changed by remotely changing logic blocks of the FPGA board 140.

The communication unit 142 communicates between the FPGA board 140 and other components of the camera 100. In particular, the communication unit 142 delivers logic block information received from the host device 300 by the camera communication unit 160 to the storage unit 143 so that the storage unit to be described below may apply the logic block information to the FPGA board 140. In addition, the communication unit 142 may function as an Ethernet controller embedded in the FPGA board 140.

The storage unit 143 records logic block information related to the ISP functions, which the CPU 130 remotely receives from the host device 300, in the FPGA board 140. Alternatively, the storage unit 143 records initial logic block information stored in the ROM 131 in the FPGA board 140.

The storage unit 143 may store the logic block information in a static RAM (SRAM) included in the FPAG board 140. In the FPGA board 140, connection switch points for programming are controlled by SRAM cells of the SRAM and logic block information for controlling connection points is stored in the SRAM cells. Since the SRAM is a volatile device, the logic block information is lost when a power supply is turned off. However, since the SRAM may store the logic block information while the power supply is supplied, the storage unit 143 may store or change ISP functions of the FPGA board 140 by using downloaded the logic block information.

The image processing unit 144 receives an image signal from the preprocessor 120 and processes the image signal based on ISP functions recorded in the FPGA board 140. In more detail, the image processing unit 144 generates an image signal processed based on a white balance control value, a contour emphasis control value, etc. The processed image signal may be applied to the compression/decompression unit 121. As described above, the image processing unit 144 processes an image by using different methods according to types of ISP functions. Additionally, the processed image signal may be used as a live view image, and may be transmitted to the camera display unit 150 through the RAM 132.

Since ISP functions embedded in a related art camera is configured only once according to the camera in which it is embedded during manufacturing, it is impossible to change logic blocks of the ISP functions, and thus, it is required to replace hardware of the camera in order to change a use of the camera. On the contrary, according to the current embodiment, the storage unit 143 may update or change ISP functions stored in the FPGA board 140 by using logic block information transmitted through the network 200. Accordingly, ISP functions of the camera 100 may be remotely updated or changed without changing hardware of the camera 100, thereby improving a user convenience.

Figure 4A:
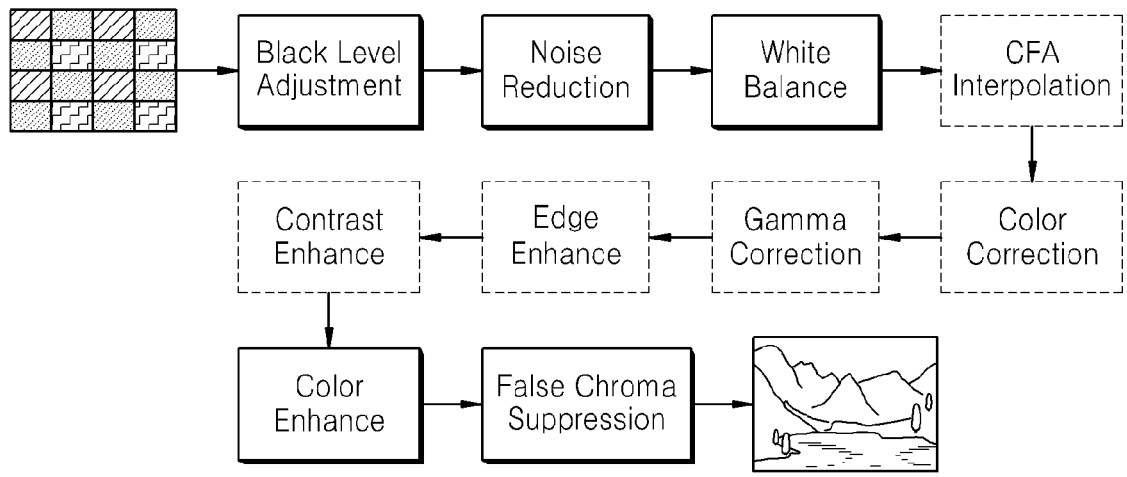
FIGS. 4A through 4C are schematic diagrams illustrating image processing using different ISP functions according to uses of a camera, according to exemplary embodiments.
Figure 4B:
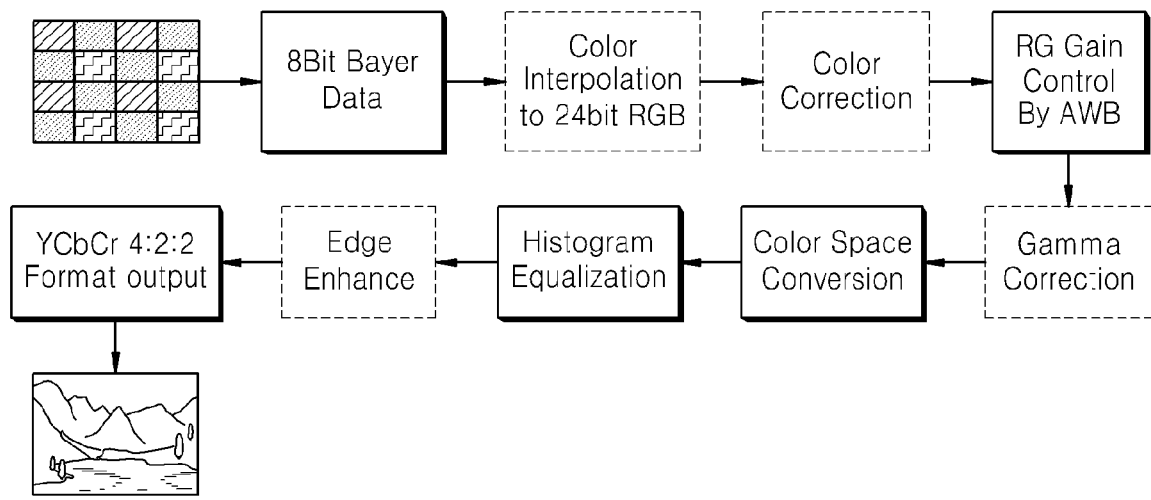
Figure 4C:
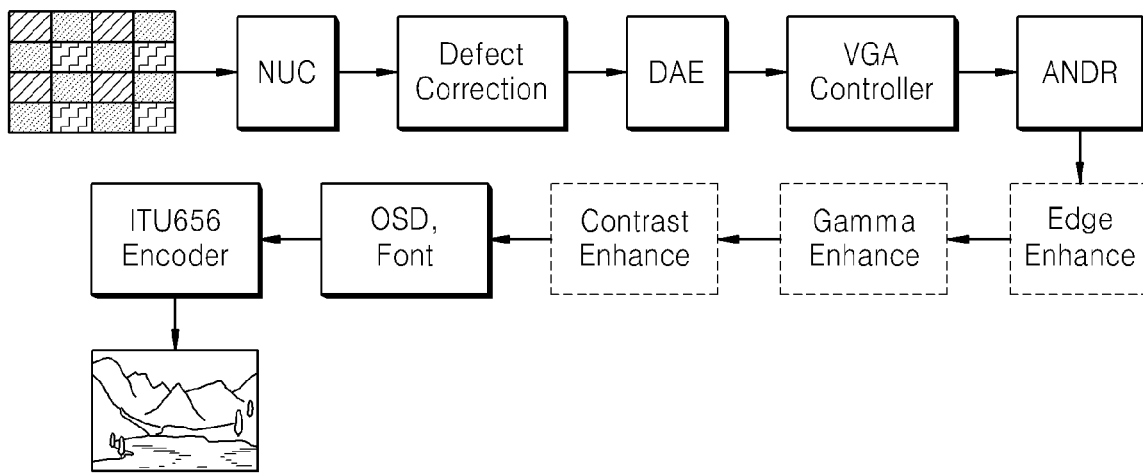

FIGS. 4A through 4C are schematic diagrams illustrating image processing using different ISP functions according to uses of a camera, according to exemplary embodiments.

That is, FIGS. 4A through 4C are block diagrams illustrating image signal processing using different ISP functions. FIG. 4A illustrates image signal processing using ISP functions for a general purpose camera, FIG. 4B illustrates image signal processing using ISP functions for a closed-circuit television (CCTV) camera, and FIG. 4C illustrates image signal processing using ISP functions for a thermal imaging camera.

As shown in FIG. 4A, the ISP functions for the general purpose camera processes an image through processes, such as "black level adjustment", "noise reduction", "white balance", "color filter array (CFA) interpolation", "color correction", "gamma correction", "edge enhance", "contrast enhance", "color enhance", and "false chroma suppression". A detailed image processing method of each process may refer to related art technologies.

As illustrated in FIG. 4B, the ISP functions for the CCTV camera processes an image through processes, such as "8-bit Bayer data", "color interpolation to 24-bit red/green/blue (RGB)", "color correction", "RG gain control by auto white balance (AWB)", "gamma correction", "color space conversion", "histogram equalization", "edge enhance", and "YCbCr 4:2:2 format output". Likewise, a detailed image processing method of each process may refer to related art technologies.

As illustrated in FIG. 4C, the ISP functions for the thermal imaging camera processes an image through processes, such as "non-uniformity calibration (NUC)", "defect correction", "digital auto exposure controller (DAE)", "video graphics array (VGA) controller", "adaptive digital noise reducer (ADNR)", "edge enhance", "gamma enhance", "contrast enhance", "on-screen display (OSD) font", and "ITU656 encoder". Likewise, a detailed image processing method of each process may refer to related art technologies.

As shown in FIGS. 4A through 4C, ISP functions vary according to uses of a camera, and in related art technologies, it is required to replace hardware of the camera in order to apply different ISP functions to the camera. On the contrary, in the current embodiment, logic block information including logic blocks of ISP functions may be remotely downloaded from the host device 300 and may be recorded in the FPGA board 140. That is, even if the ISP functions of the general purpose camera as shown in FIG. 4A were applied to the FPGA board 140, the storage unit 143 may change these ISP functions of the camera 100 to ISP functions for a CCTV camera by downloading logic block information including logic blocks of the ISP for a CCTV camera from the host device 300 to update the FPGA board 140.

In addition, the storage unit 143 may download logic block information into the FPGA board 140 only for those portions that have changed in existing ISP functions. For example, in FIG. 4A, functions indicated by a dotted line, such as "color filter array (CFA) Interpolation", "color correction", "gamma correction", "edge enhance", and "contrast enhance" may be also used as ISP functions of another use. In this case, the storage unit 143 may replace only ISP functions indicated by a solid line, but not the ISP functions that are indicated by the dotted line.

In addition, the storage unit 143 may inspect whether logic block information includes an error before providing the logic block information to the image processing unit 144. Additionally, logic block information which the storage unit 143 stores in the FPGA board 140 may be not only information related to ISP functions, but may also be information related to the maintenance of the camera 100. For example, when it is determined that there is an error in a specific structure of the FPGA board 140, logic block information about repair may be downloaded from the server 100 to change logic blocks of the FPGA board 140.

The current embodiment addresses changing ISP functions for one use to different ISP functions for another use. According to another exemplary embodiment, however, ISP functions for one use may be updated by downloading corresponding logic block information into the FPGA board 140 without changing the use.

Figure 5:
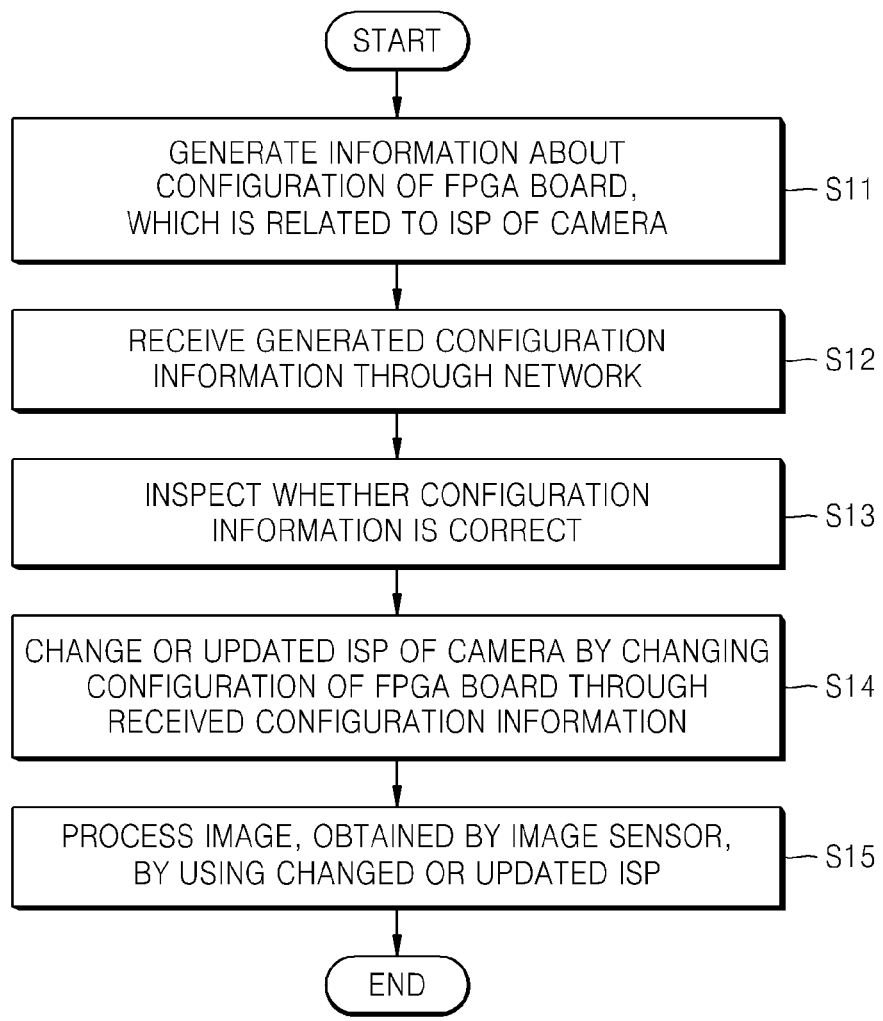
FIG. 5 is a flowchart illustrating a method of remotely changing logic blocks of an FPGA board, according to an exemplary embodiment.

FIG. 5 is a flowchart illustrating a method of remotely changing logic blocks of an FPGA board, according to an exemplary embodiment.

First, a host generates logic block information of the FPGA board, which is related to at least one ISP function of a camera (operation S11).

Next, the FPGA board in the camera receives the generated logic block information from the host through a network (operation S12).

Next, the FPGA board inspects whether the received logic block information is correct (operation S13).

Next, at least one ISP function of the camera is changed or updated by changing or reconfiguring at least one logic block of the FPGA board through the received logic block information (operation S14).

Finally, an image obtained by an image sensor is processed by using the changed ISP function (operation S15).

FIG. 6 is a flowchart illustrating an operation of a camera including an FPGA board having a communication unit, according to an exemplary embodiment.

Referring to FIG. 6, first, an FPGA board of a camera supplies a clock signal to a driver of an image sensor (operation S21).

Next, the image sensor stores captured image data into the FPGA board (operation S22).

In this process, it may be inspected whether there is an error in the FPGA board (operation S23). If there is an error, logic block information for the maintenance of the FPGA board may be received from a host device, and then, may be stored in the FPGA board (operation S24).

Next, if it is desired to change or update at least one ISP function of the FPGA board, logic block information generated in relation to the ISP function is received through a network (operation S25).

Next, an ISP of the camera is changed or updated by changing or reconfiguring at least one logic block of the FPGA board by using the received logic block information (operation S26).

Finally, an image processed by using the changed or updated ISP function is provided to a camera display or is provided to the host device through the network (operation S27).

According to the embodiments, an ISP function may be performed in an FPGA board embedded in a camera and information about logic blocks of the FPGA board may be remotely received to remotely change or update the ISP.

According to the embodiments, an ISP function and a communication function may be performed in an FPGA board embedded in a camera and hardware and software configurations of the camera may be remotely changed by changing or reconfiguring logic blocks of the FPGA board.

While the inventive concept has been particularly shown and described with reference to exemplary embodiments thereof, it will be understood by those of ordinary skill in the art that various changes in form and details may be made therein without departing from the spirit and scope of the inventive concept as defined by the appended claims. For example, the FPGA described in the above exemplary embodiments is only an exemplary type of integrated circuit. Thus, the inventive concept may be applied to not only the FPGA but also another type of integrated circuit. For another example, the logic block information to reconfigure logic block of the FPGA board may be received from not only an external host device such as the host 300 in FIG. 1 but also an embedded ROM such as the ROM 131 in FIG. 2. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A camera having a reconfigurable logic block, the camera comprising:
   an integrated circuit (IC) comprising at least one logic block; and
   a processor configured to receive information about the logic block of the IC, and transmit the information about the logic block to the IC to update at least one existing signal processing (ISP) function recorded in the IC or change the existing ISP function to another at least one ISP function for a different use according to the information about the logic block,
   wherein each of the existing ISP function and the other ISP function is used to process an image signal obtained by the camera, and wherein if an error occurs while the IC receives the information about the logic block, the processor reads initial information about the logic block from a memory embedded in the camera, transmits the read initial information about the logic block to the IC, and controls the IC to update the existing ISP function or change the existing ISP function to the other ISP function according to the initial information about the logic block.

2. The camera of claim 1, wherein the information about the logic block comprises information about at least one ISP function to update the existing ISP function or change the existing ISP function to the other ISP function.

3. The camera of claim 2, wherein the IC comprises a field programmable gate array (FPGA).

4. The camera of claim 1, wherein the existing ISP function is one of an ISP function for a general purpose camera, an ISP function for a closed-circuit television (CCTV) camera, and an ISP function for a thermal imaging camera, and
wherein the other ISP function is another one of the above three ISP functions.

5. The camera of claim 1, wherein the existing ISP function is:
first at least one of black level adjustment, noise reduction, white balance, color filter array interpolation, color correction, gamma correction, edge enhance, contrast enhance, color enhance, and false chroma suppression;
second at least one of 8-bit Bayer data, color interpolation to 24-bit red/green/blue, color correction, red/green gain control by auto white balance, gamma correction, color space conversion, histogram equalization, edge enhance, and YCbCr 4:2:2 format output; or
third at least one of non-uniformity calibration, defect correction, digital auto exposure controller, video graphics array controller, adaptive digital noise reducer, edge enhance, gamma enhance, contrast enhance, on-screen display font, and ITU656 encoder, and
wherein the other ISP function is one, among the first at least one, the second at least one and the third at least one, which is different from the existing ISP function.

6. The camera of claim 1, wherein the IC is configured to receive the information about the logic block from the processor whenever power of the camera is turned on, and then, update the existing ISP function or change the existing ISP function to the other ISP function according to the information about the logic block.

7. The camera of claim 1, wherein the processor is configured to receive the information about the logic block of the IC from a read only memory (ROM) embedded in the camera.

8. The camera of claim 1, wherein the processor is configured to remotely receive the information about the logic block of the IC from a host connected to the camera through a network external to the camera.

9. The system of claim 1, wherein the information about the logic block comprises information about maintenance of the camera.

10. The system of claim 1, wherein the IC is further configured such that, before updating or changing the existing ISP function according to the information about the logic block, the IC inspects whether the information about the logic block includes an error.

11. The camera of claim 1, wherein the processor is configured to transmit the information about the logic block to the IC to change the existing ISP function to the other ISP function for the different use according to the information about the logic block, but is not configured to update the existing ISP function.

12. A method of reconfiguring at least one logic block of an integrated circuit (IC) of a camera, the method comprising:
receiving information about the logic blocks of the IC; and
transmitting the information about the logic block to the IC to update at least one existing signal processing (ISP) function recorded in the IC or change the existing ISP function to another at least one ISP function for a different use according to the information about the logic block,
wherein each of the existing ISP function and the other ISP function is used to process an image signal obtained by the camera, and
wherein if an error occurs while receiving the information about the logic block, the transmitting comprises reading initial information about the logic block from a memory embedded in the camera, transmitting the read initial information about the logic block to the IC, and controlling the IC to update the existing ISP function or change the existing ISP function to the other ISP function according to the initial information about the logic block.

13. The method of claim 12, wherein the IC comprises a field programmable gate array (FPGA).

14. The method of claim 12, wherein the existing ISP function is one of an ISP function for a general purpose camera, an ISP function for a closed-circuit television (CCTV) camera, and an ISP function for a thermal imaging camera, and
wherein the other ISP function is another one of the above three ISP functions.

15. The method of claim 12, wherein the receiving comprises receiving the information about the logic block of the IC from a read only memory (ROM) embedded in the camera.

16. The method of claim 12, the receiving comprises remotely receiving the information about the logic block of the IC from a host connected to the camera through a network external to the camera.

17. The method of claim 12, wherein the information about the logic block comprises information about maintenance of the camera.

18. The method of claim 12, wherein before updating or changing the existing ISP function according to the information about the logic block, it is inspected whether the information about the logic block includes an error.

19. A camera system comprising:
a camera of claim 1; and
a host device configured to provide the information about the logic block of the IC to the processor of the camera.

* * * * *